(12) United States Patent
Maruoka

(10) Patent No.: US 11,100,317 B2
(45) Date of Patent: Aug. 24, 2021

(54) DRAWING DEVICE AND DRAWING METHOD

(71) Applicant: Wacom Co., Ltd., Saitama (JP)

(72) Inventor: Isao Maruoka, Gunma (JP)

(73) Assignee: Wacom Co., Ltd., Saitama (JP)

( * ) Notice: Subject to any disclaimer, the term of this patent is extended or adjusted under 35 U.S.C. 154(b) by 62 days.

(21) Appl. No.: 16/431,803

(22) Filed: Jun. 5, 2019

(65) Prior Publication Data
US 2019/0286894 A1    Sep. 19, 2019

Related U.S. Application Data

(63) Continuation of application No. PCT/JP2017/036160, filed on Oct. 4, 2017.

(30) Foreign Application Priority Data

Jan. 11, 2017  (JP) .............................. JP2017-002435
Feb. 24, 2017  (JP) .............................. JP2017-033285

(51) Int. Cl.
| G06K 9/00 | (2006.01) |
| G06F 3/0354 | (2013.01) |
| G06F 3/038 | (2013.01) |
| G06T 13/80 | (2011.01) |

(52) U.S. Cl.
CPC ....... *G06K 9/00416* (2013.01); *G06F 3/0383* (2013.01); *G06F 3/03545* (2013.01); *G06T 13/80* (2013.01); *G06F 2203/011* (2013.01)

(58) Field of Classification Search
CPC .... G06K 9/00416; G06K 9/222; G06T 13/80; G06F 3/03545; G06F 3/0383; G06F 2203/011; G06F 3/015; G06F 3/03547; G06F 3/04883
See application file for complete search history.

(56) References Cited

U.S. PATENT DOCUMENTS

| 6,798,907 B1 * | 9/2004 | Clary .................. G06F 3/04883 382/187 |
| 2015/0116283 A1 * | 4/2015 | Black ................. G06K 9/00416 345/179 |
| 2015/0206154 A1 * | 7/2015 | Lenka ..................... G06F 9/451 705/7.29 |
| 2017/0131801 A1 * | 5/2017 | Xiong ................. G06F 3/03545 |

FOREIGN PATENT DOCUMENTS

| JP | 10-27544 A | 10/1998 |
| JP | 11/259669 A | 9/1999 |
| JP | 2016-119051 A | 6/2019 |

OTHER PUBLICATIONS

Machine translation for JP H11-259669, IDS (Year: 1999).*
Koshu Morioka, "Handwriting Characteristic Manual, Illustration of 72 Items," Revised Edition, Japan Graphologist Association, Mar. 10, 2014, 12 pages [with machine translation].

* cited by examiner

*Primary Examiner* — Qian Yang
(74) *Attorney, Agent, or Firm* — Seed IP Law Group LLP

(57) ABSTRACT

A drawing device draws stroke data including a plurality of control points. The drawing device includes at least one processor; and at least one memory device storing at least one program that, when executed by the at least one processor, causes the drawing device to: generate intermediate data formed from movement of the stroke data by moving each of the plurality of control points, and control a display device to sequentially draw at least the generated intermediate data.

14 Claims, 16 Drawing Sheets

DRAWING DEVICE AND DRAWING METHOD

BACKGROUND

Technical Field

The present disclosure relates to a drawing device and a drawing method, and particularly to a drawing device and a drawing method for generating an animation of stroke data of digital ink.

Background Art

Digital ink is known which is formed by converting, into electronic data, a trajectory (stroke) obtained by moving an indicator such as an electronic pen, a stylus, or the like on a position detector such as a tablet or the like. Japanese Patent Laid-Open No. 2016-119051 (hereinafter referred to as Patent Document 1) discloses an example of digital ink.

As partly illustrated also in Patent Document 1, digital ink includes a plurality of control points, and a line drawing is drawn by interpolating these control points using an interpolation curve such as a Bezier curve, a spline curve, a Catmull-Rom curve, or the like at a time of drawing.

In addition, Koshu Morioka, "Handwriting Characteristic Manual, Illustration of 72 Items," Revised Edition, Japan Graphologist Association, Mar. 10, 2014 (hereinafter referred to as Non-Patent Document 1) illustrates, in regard to various handwriting characteristics, relations between the characteristics appearing in handwriting of users and personalities of the users.

A technology has recently emerged which automatically creates an animation moving image from a line drawing drawn on a computer. This technology adds a plurality of intermediate frames connecting two given key frames with each other by interpolation processing or the like, and selects and displays these frames at predetermined time intervals. According to this technology, the animation moving image as a completed product includes a large number of intermediate frames in addition to a plurality of key frames.

However, according to this method, the intermediate frames need to be generated before reproduction of the moving image. There are thus a problem of an increase in an amount of usage of memory and a problem of being unable to view the animation moving image until an end of intermediate frame generation processing.

BRIEF SUMMARY

It is accordingly an object of the present disclosure to provide a drawing device that can generate an animation moving image more effectively.

According to one aspect of the present disclosure, there is provided a drawing device that draws stroke data including a plurality of control points, the drawing device including: at least one processor; and at least one memory device storing at least one program that, when executed by the at least one processor, causes the drawing device to: generate intermediate data formed from movement of the stroke data by moving each of the plurality of control points; and control a display device to sequentially draw the stroke data and the intermediate data.

According to another aspect of the present disclosure, there is provided a drawing device that draws stroke data including a plurality of control points, the drawing device including: at least one processor; and at least one memory device storing at least one program that, when executed by the at least one processor, causes the drawing device to: receive first stroke data including a plurality of first control points and second stroke data including a plurality of second control points corresponding to the plurality of first control points on a one-to-one basis, generate one or more pieces of intermediate data as stroke data including a plurality of third control points respectively corresponding to the plurality of first control points on a one-to-one basis by generating a third control point for each of the plurality of first control points by interpolation from the first control point and the second control point corresponding to the first control point; and sequentially draw data corresponding to the first stroke data, the one or more pieces of intermediate data, and data corresponding to the second stroke data.

According to one aspect of the present disclosure, there is provided a drawing method for drawing stroke data including a plurality of control points by interpolating the plurality of control points by using an interpolation curve, the drawing method including: generating intermediate data formed from movement of the stroke data by moving each of the plurality of control points; and sequentially drawing the stroke data and the intermediate data.

According to another aspect of the present disclosure, there is provided a drawing method for drawing stroke data including a plurality of control points by interpolating the plurality of control points by using an interpolation curve, the drawing method including: receiving first stroke data including a plurality of first control points and second stroke data including a plurality of second control points corresponding to the plurality of first control points on a one-to-one basis; generating one or more pieces of intermediate data as stroke data including a plurality of third control points respectively corresponding to the plurality of first control points on a one-to-one basis by generating a third control point for each of the plurality of first control points by interpolation from the first control point and the second control point corresponding to the first control point; and sequentially drawing data corresponding to the first stroke data, the one or more pieces of intermediate data, and data corresponding to the second stroke data.

The present disclosure generates intermediate data formed from movement of stroke data by moving each control point of the stroke data. An animation moving image can be thereby generated more effectively.

DETAILED DESCRIPTION OF PREFERRED EMBODIMENTS

Embodiments of the present disclosure will hereinafter be described in detail with reference to the accompanying drawings.

Figure 1:
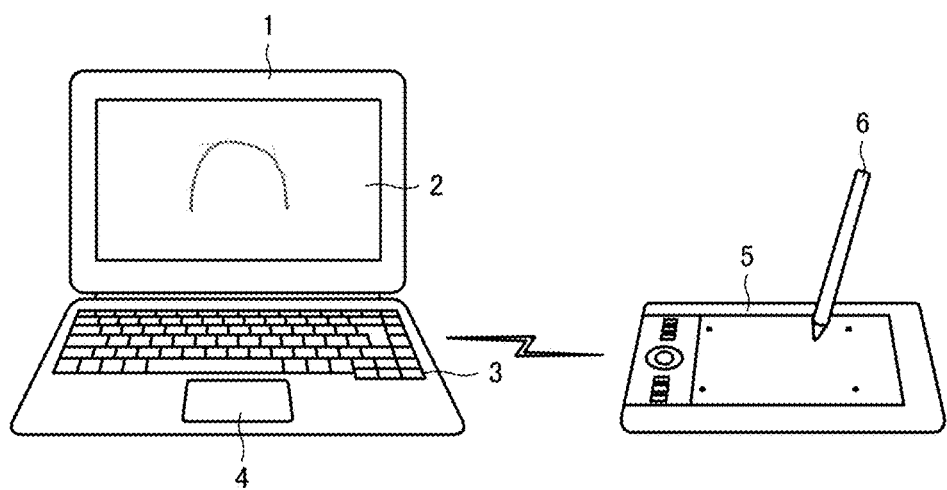
FIG. 1 is a diagram illustrating a computer, a digitizer, and an electronic pen according to a first embodiment of the present disclosure.

FIG. 1 is a diagram illustrating a computer 1, a digitizer 5, and an electronic pen 6 according to an embodiment of the present disclosure. The computer 1 internally has a processor and a memory, which are not illustrated. The computer 1 is configured to perform various kinds of processing to be described in the following as operations of the computer 1 by execution of a program stored in the memory by the processor. The computer 1 is also configured to have an output device including a display device 2 and an input device including a keyboard 3 and a mouse pad 4. Incidentally, while the computer 1 is depicted as a so-called notebook personal computer in FIG. 1, the computer 1 can also be constituted by another kind of computer such as a desktop computer, a server computer, a smart phone, or the like.

The digitizer 5 is, for example, a device functioning as an input device external to the computer 1. The digitizer 5 is configured to have a touch surface for receiving input by the electronic pen 6. The digitizer 5 and the computer 1 are connected to each other by wired connection such as universal serial bus (USB) or the like or wireless connection such as Bluetooth (registered trademark) or the like. The digitizer 5 and the electronic pen 6 may be capable of unidirectional or bidirectional communication. Various kinds of systems such as a capacitive system, an electromagnetic induction system, and the like can be used as a communication system in that case. Incidentally, the digitizer 5 also includes a liquid crystal tablet and a device functioning as an input device included in a computer.

The digitizer 5 is configured to be able to obtain coordinates (an X-coordinate and a Y-coordinate) indicating the position of the electronic pen 6 on the touch surface when the electronic pen 6 is present on the touch surface. When a user moves the electronic pen 6 on the touch surface, the digitizer 5 obtains a series of coordinates indicating the trajectory of the electronic pen 6, and successively supplies the series of coordinates as control points of stroke data to the computer 1. Incidentally, one piece of stroke data is constituted of a series of control points obtained from a time point that the electronic pen 6 comes into contact with the touch surface (pen-down) to a time point that the electronic pen 6 is separated from the touch surface (pen-up).

The digitizer 5 is also configured to receive, from the electronic pen 6, a unique identifier (ID) for identifying the electronic pen 6 and pen pressure information indicating a pressing force of the electronic pen 6 against the input surface of the digitizer 5 in a case where the digitizer 5 can receive data from the electronic pen 6. The unique ID is transmitted from the electronic pen 6 to the digitizer 5 at the time of the pen-down, for example. On the other hand, the pen pressure information is transmitted from the electronic pen 6 to the digitizer 5. The digitizer 5 is configured to supply these pieces of information to the computer 1 each time the digitizer 5 receives the information.

The computer 1 functions as a storage device that stores stroke data by sequentially storing the series of control points supplied from the digitizer 5, and functions as a drawing device that draws stroke data being stored or already stored on the display by rendering the stroke data. Specifically, the rendering of the stroke data is performed by interpolating a series of control points by using an interpolation curve such as a Bezier curve, a spline curve, a Catmull-Rom curve, or the like.

Here, before drawing the stroke data, the computer 1 performs processing of adding line width information indicating a line width as metadata to each control point included in the stroke data. In this case, when the computer 1 is supplied with pen pressure information from the digitizer 5 together with each control point, the computer 1 determines the line width of each control point on the basis of the pen pressure information. In a case where the pen pressure information is not supplied from the digitizer 5, on the other hand, a default fixed value is determined as the line width of each control point. When the computer 1 draws the stroke data, the computer 1 controls the line width of a curve being drawn on the basis of the line width information added to each control point.

The computer 1 also performs processing of adding color information indicating a color (a line color, for example) as metadata to the stroke data before the computer 1 draws the stroke data. In this case, when the computer 1 is supplied with the unique ID of the electronic pen 6 from the digitizer 5, and a color is determined for each unique ID, the computer 1 determines the color determined according to the unique ID as the line color of the stroke data. On the other hand, a default value (black, for example) is otherwise determined as the line color of the stroke data. When the computer 1 draws the stroke data, the computer 1 controls the line color of the curve being drawn on the basis of the line color information added to the stroke data.

Further, in a case where the stroke data as a drawing object constitutes a closed curve (that is, in a case where control points at both ends are present at a same position), the computer 1 also performs processing of adding filling color information indicating a filling color as metadata to the stroke data before the computer 1 draws the stroke data. The computer 1 preferably determines a default value (white or transparency, for example) as the filling color of the stroke data. When the computer 1 draws the stroke data constituting the closed curve, the computer 1 controls the filling color of a region enclosed by the curve being drawn on the basis of the filling color information added to the stroke data.

Figure 2:
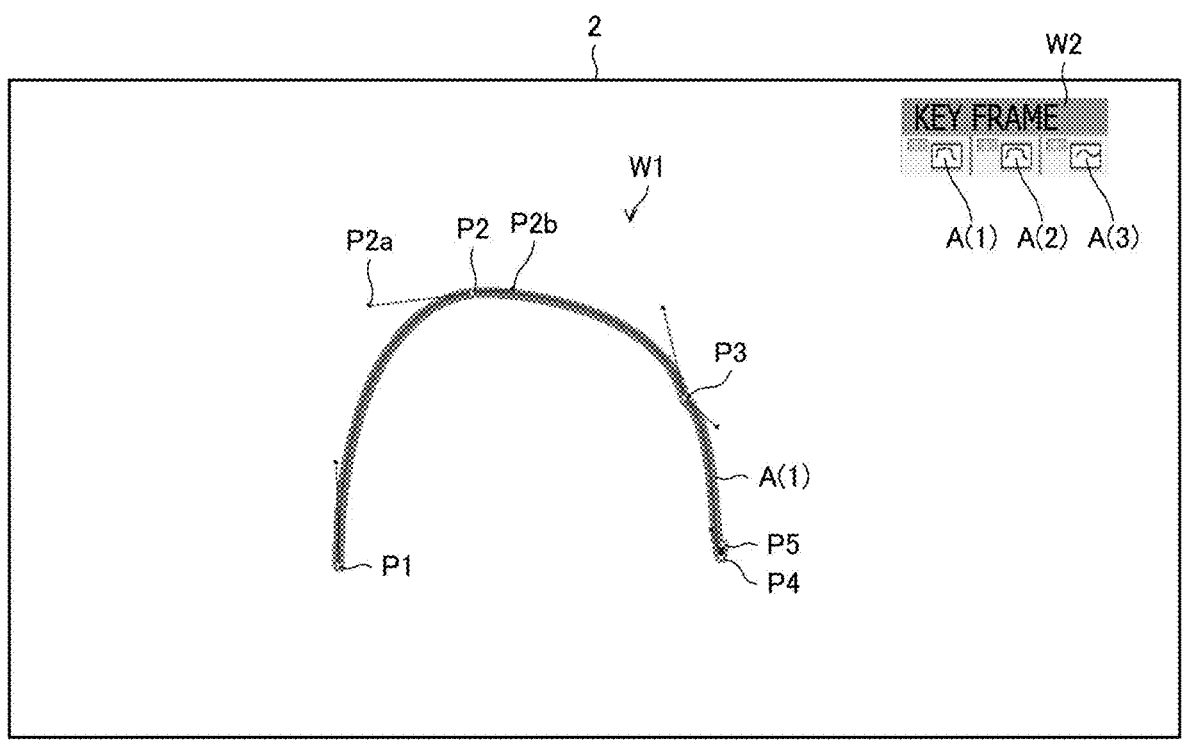
FIG. 2 is a diagram illustrating an example of a screen displayed on a display device by the computer illustrated in FIG. 1.

FIG. 2 is a diagram illustrating an example of a screen displayed on the display device 2 by the computer 1. The diagram illustrates an example of the screen of a drawing app for performing stroke data drawing processing. As illustrated in the figure, the screen is configured to have windows W1 and W2.

The window W1 is a region functioning as a canvas for the computer 1 to draw stroke data. In the example of FIG. 2, stroke data A(1) is drawn within the window W1. The stroke data A(1) is stroke data having five control points P1 to P5. The computer 1 performs interpolation between these five control points P1 to P5 by a spline curve.

As illustrated in FIG. 2, the computer 1 is configured to add a tangent handle to each control point when the computer 1 renders the stroke data. The number of control handles to be added is one for a control point as an endpoint, and is two for a control point as an intermediate point. FIG. 2 illustrates control handles P2a and P2b of a control point P2. Each control point and each control handle are movable by the user. The shape of the drawn stroke data is thereby susceptible of posterior changes by the user. In addition, the computer 1 has functions of receiving a change of a line color, a line width, or a filling color by the user for the stroke data displayed within the window W1, reflecting a result of the change in the stroke data being drawn, and updating metadata added to the stroke data (or each control point of the stroke data) on the basis of line color information, line width information, or filling color information respectively indicating the line color, the line width, or the filling color after the change.

The computer 1 also has a function of generating an animation moving image on the basis of a plurality of pieces of stroke data. The window W2 in FIG. 2 is a window for displaying thumbnail images of stroke data serving as a key (which stroke data will hereinafter be referred to as a "key frame") when the animation moving image is thus generated. An example in which three pieces of stroke data A(1) to A(3) are prepared as key frames is illustrated in FIG. 2.

Figure 3:
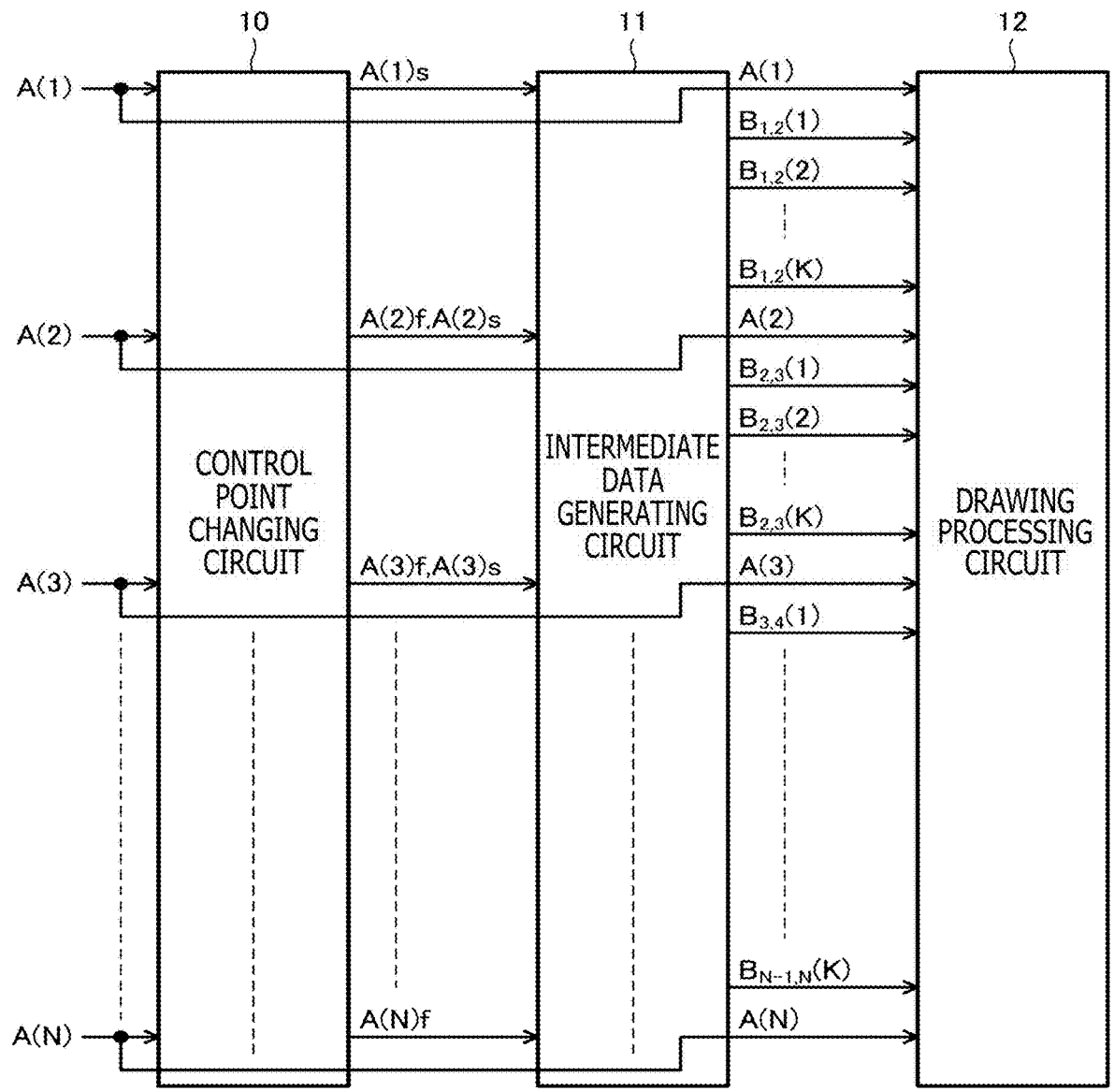
FIG. 3 is a schematic block diagram illustrating functional blocks of the computer illustrated in FIG. 1.

FIG. 3 is a schematic block diagram illustrating functional blocks of the computer 1. The diagram illustrates functional blocks related to the generation of an animation moving image based on a plurality of pieces of stroke data. As illustrated in the figure, the computer 1 is functionally configured to have a control point changing circuit 10, an intermediate data generating circuit 11, and a drawing processing circuit 12. In one or more embodiments, when one or more processors of the computer 1 execute one or more programs stored in one or more memory devices, the one or more processors perform the functions of the control point changing circuit 10, the intermediate data generating circuit 11, and the drawing processing circuit 12.

Description will first be made of usage of symbols in the following description. In the following, each piece of stroke data will be denoted as A(n), where n is an integer of 1 to N. In addition, stroke data after the control point changing circuit 10 changes control points of the stroke data A(n) will be denoted as stroke data A(n)s or stroke data A(n)f. s at the tail of the symbol denotes stroke data serving as a starting (start) point of intermediate data generation. f at the tail of the symbol denotes stroke data serving as an ending (finish) point of intermediate data generation. Further, stroke data generated by the intermediate data generating circuit 11 on the basis of the stroke data A(n) and stroke data A(n+1) will be written as intermediate data $B_{n,\ n+1}(k)$, where k is an integer of 1 to K. In addition, a control point of stroke data X (X is one of A(n), A(n)s, A(n)f, and $B_{n,\ n+1}(k)$) will be written as PX[m], where m is an integer of 1 to M.

In addition, operation (control point change processing) of the control point changing circuit 10, operation (intermediate data generation processing) of the intermediate data generating circuit 11, and operation (drawing processing) of the drawing processing circuit 12 to be described in the following are performed in parallel with each other. Specifically, when the control point changing circuit 10 generates stroke data A(n)s and A(n+1)f, for example, the intermediate data generating circuit 11 starts to generate intermediate data $B_{n,\ n-1}(k)$ related to the stroke data A(n)s and A(n+1)f without waiting for generation of stroke data A(n+1)s. In addition, when the intermediate data generating circuit 11 generates the intermediate data $B_{n,\ n+1}(k)$, the drawing processing circuit 12 starts to draw the intermediate data $B_{n,\ n-1}(k)$ without waiting for generation of intermediate data $B_{n+1,\ n+2}(k)$. It thus becomes possible to generate and draw the intermediate data in real time at a time of moving image reproduction.

The control point changing circuit 10 is a functional circuit that receives input of a plurality of pieces of stroke data A(n) (n is an integer of 1 to N) specified within the window W2 illustrated in FIG. 2 and generates stroke data A(n)s and stroke data A(n)f on the basis of the numbers of control points included in these pieces of stroke data. Processing performed by the control point changing circuit 10 will be described in detail in the following with reference to FIG. 4.

Figure 4:
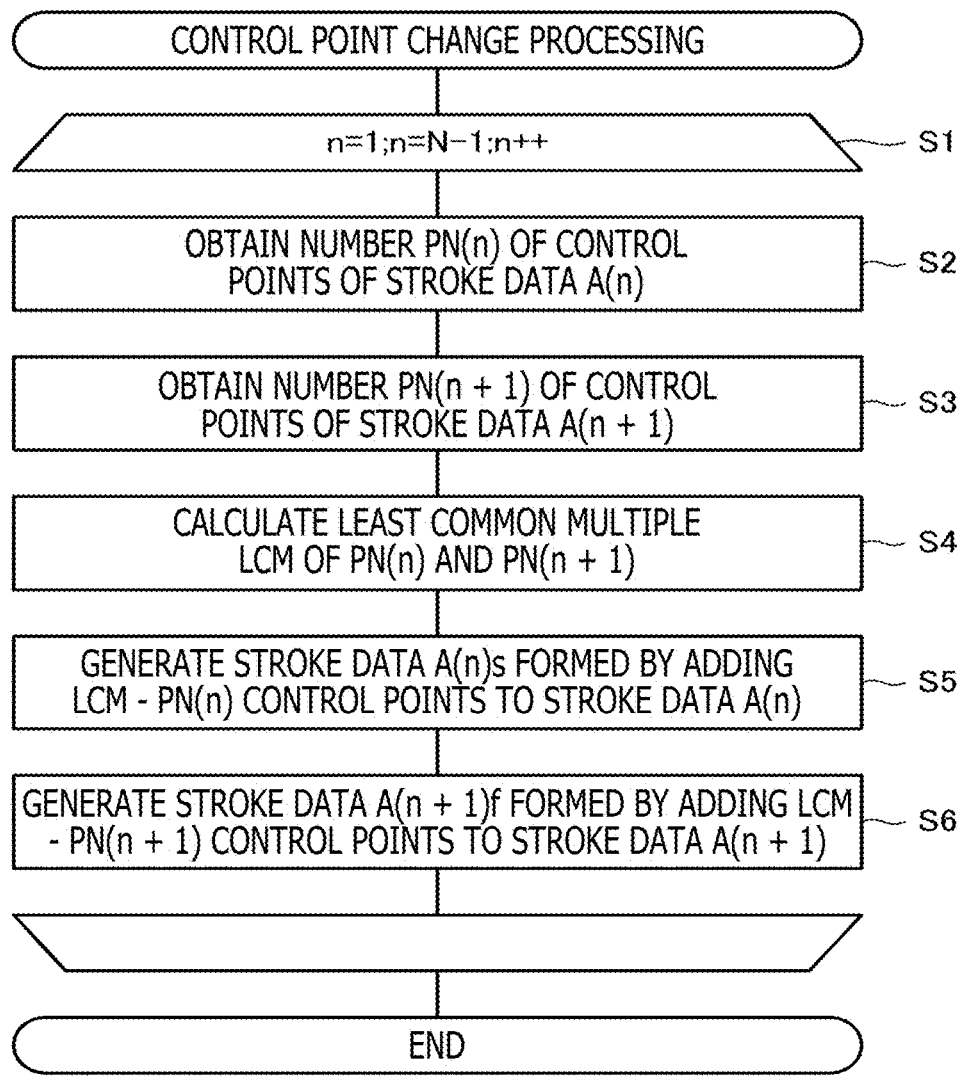
FIG. 4 is a flowchart illustrating a processing flow of control point change processing performed by a control point changing circuit illustrated in FIG. 3.

FIG. 4 is a flowchart illustrating a processing flow of control point change processing performed by the control point changing circuit 10. As illustrated in the figure, the control point changing circuit 10 is configured to perform the processing at S2 to S6 for a variable n of 1 to N-1 repeatedly (S1).

At S2 and S3, the control point changing circuit 10 obtains the number PN(n) of a plurality of control points (fourth control points) included in stroke data A(n) (fourth stroke data) and the number PN(n+1) of a plurality of control points (fifth control points) included in stroke data A(n+1) (fifth stroke data). The control point changing circuit 10 next calculates a least common multiple LCM of the two obtained numbers PN(n) and PN(n+1) (S1). Then, the control point changing circuit 10 generates stroke data A(n)s (first stroke data) having LCM control points (first control points) by adding LCM−PN(n) control points to the stroke data A(n) (S5), and generates stroke data A(n+1)f (second stroke data) having LCM control points (second control points) by adding LCM−PN(n+1) control points to the stroke data A(n+1) (S6).

Figure 5:
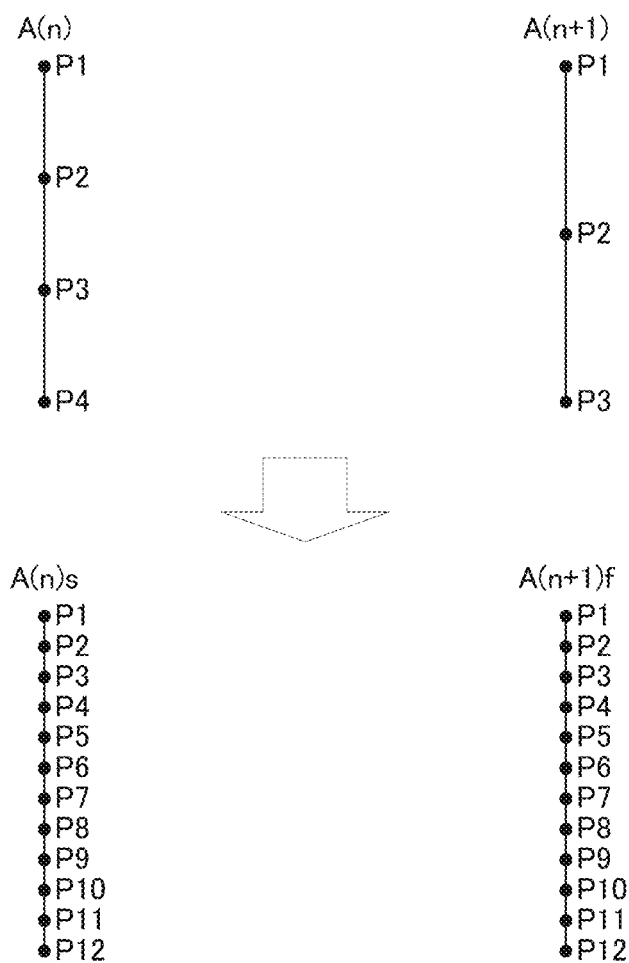
FIG. 5 is a diagram of assistance in explaining the control point change processing illustrated in FIG. 4.

FIG. 5 is a diagram of assistance in explaining the control point change processing illustrated in FIG. 4. In an example of the figure, the stroke data A(n) has four control points P1 to P4, and the stroke data A(n+1) has three control points P1 to P3. In this case, the least common multiple LCM is 12. Each of the pieces of stroke data A(n)s and A(n+1)f thus becomes stroke data having 12 control points P1 to P12, as illustrated in a lower part of FIG. 5.

Here, the control point changing circuit 10 preferably adds new control points to each piece of stroke data A(n) such that the shape of a curve as a drawing result remains unchanged as much as possible. In addition, original control points of each piece of stroke data A(n) may be left as they are at original positions, or the positions may be changed when desired in maintaining the shape of the curve.

In addition, it suffices for the control point changing circuit 10 to perform processing such that the numbers of control points of the two pieces of stroke data A(n)s and A(n+1)f after the change, the two pieces of stroke data A(n)s and A(n+1)f being obtained for each n, are equal to each other. The control point changing circuit 10 does not necessarily need to set the numbers of control points to the least common multiple LCM as illustrated in FIG. 4 and FIG. 5.

Figure 6:
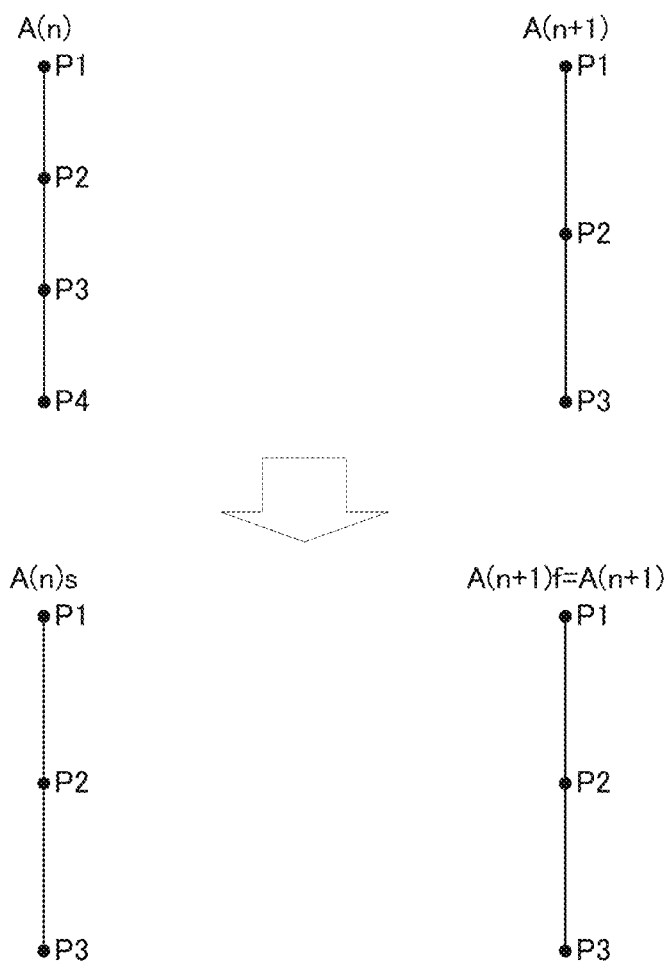
FIG. 6 is a diagram of assistance in explaining a modification of the control point change processing illustrated in FIG. 4.

For example, FIG. 6 is a diagram of assistance in explaining a modification of the control point change processing illustrated in FIG. 4. The diagram illustrates an example in which the numbers of control points of the stroke data A(n)s and A(n+1)f are adjusted to the smaller of the number PN(n) of control points of the stroke data A(n) and the number PN(n+1) of control points of the stroke data A(n+1). More specifically, the number PN(n) is 4 and the number PN(n+1) is 3, and therefore the numbers of control points of the stroke data A(n)s and A(n+1)f are each set to 3. In this case, the stroke data A(n+1)f is data identical to the stroke data A(n+1). On the other hand, the stroke data A(n)s results from removing one control point from the stroke data A(n). A result in a case where the stroke data A(n)s is drawn is consequently expected to be different from that of the stroke data A(n). However, as will be described later, the stroke data A(n)s is used only for generation of intermediate data, and the stroke data A(n) is used for the drawing of the animation moving image. The removal of the control point thus does not necessarily seriously affect the drawing result of the animation moving image.

Returning to FIG. 3, the intermediate data generating circuit 11 is a functional circuit that generates intermediate data formed from movement of stroke data by moving each of a plurality of control points. More specifically, the intermediate data generating circuit 11 is configured to receive stroke data A(n)s (first stroke data) including M control points PA(n)s[m] (first control points) and stroke data A(n+1)f (second stroke data) including M control points PA(n+1)s[m] (second control points), and generate intermediate data $B_{n,\ n+1}(k)$ as stroke data including M control points $PB_{n,\ n+1}(k)[m]$ (third control points) corresponding on a one-to-one basis to the M control points PA(n)s[m] by generating the control points $PB_{n,\ n+1}(k)[m]$ for the respective M control points PA(n)s[m] by interpolation between the control points PA(n)s[m] and the control points PA(n+1)s[m] corresponding to the control points PA(n)s[m]. Processing performed by the intermediate data generating circuit 11 will be described in detail in the following with reference to FIG. 7.

Figure 7:
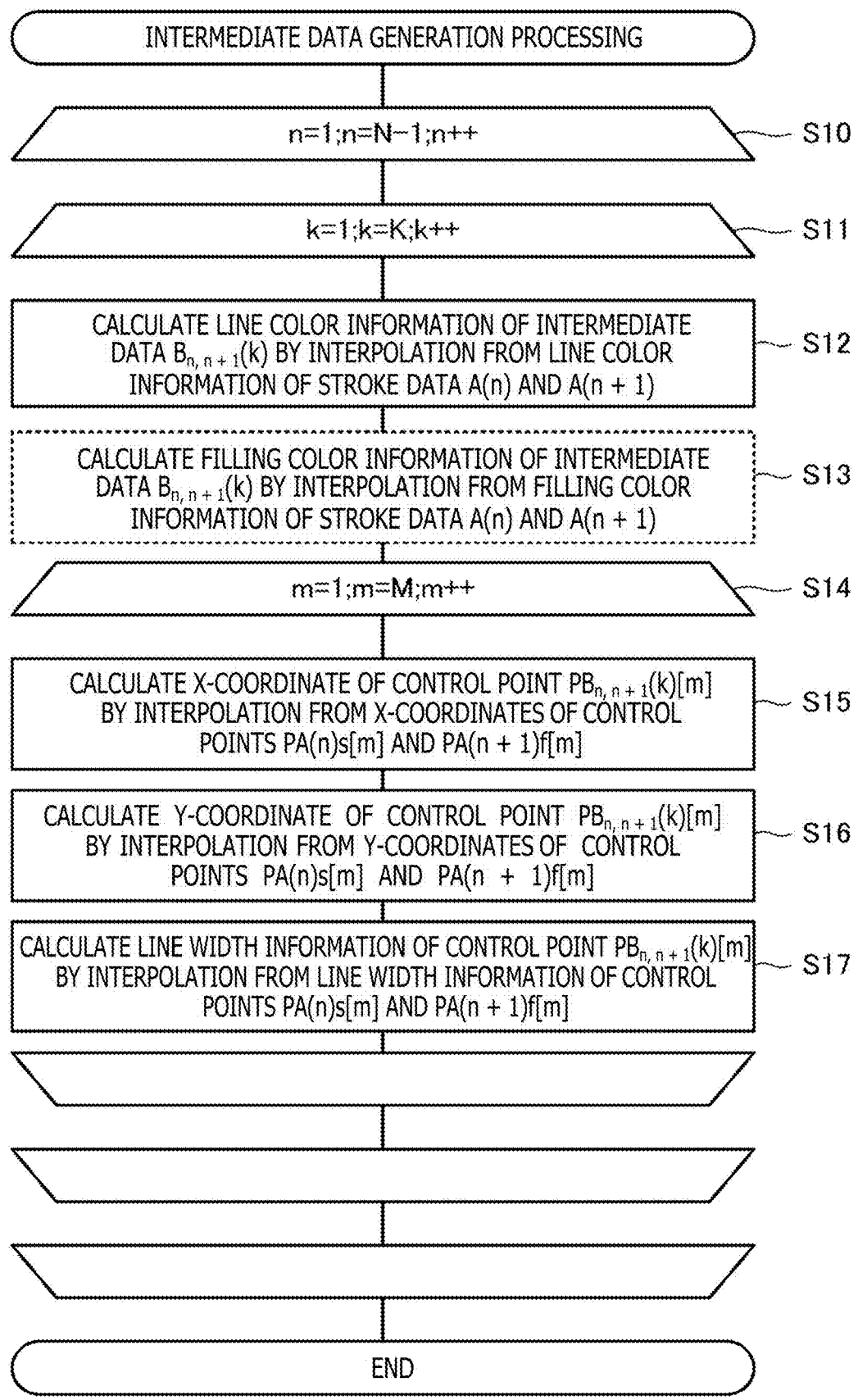
FIG. 7 is a flowchart illustrating a processing flow of intermediate data generation processing performed by an intermediate data generating circuit illustrated in FIG. 3.

FIG. 7 is a flowchart illustrating a processing flow of intermediate data generation processing performed by the intermediate data generating circuit 11. As illustrated in the figure, the intermediate data generating circuit 11 performs loop processing for each of variables n, k, and m. Specifically, the intermediate data generating circuit 11 is configured to repeatedly perform the processing at S11 to S17 for the variable n of 1 to N−1 (S10), repeatedly perform, for each n, the processing at S12 to S17 for the variable k of 1 to K (S11), and repeatedly perform, for each k, the processing at S15 to S17 for the variable m of 1 to M (S14).

The processing at S12 and S13 is processing related to the whole of stroke data. The intermediate data generating circuit 11 performs the processing at S12 and S13 for each of K pieces of intermediate data $B_{n,\ n+1}(k)$ generated in correspondence with the stroke data A(n)s and A(n+1)f. Specifically, the intermediate data generating circuit 11 calculates line color information (third line color information) indicating the line color of the intermediate data $B_{n,\ n+1}(k)$ by interpolation from line color information (first and second line color information) indicating the line color of the stroke data A(n) and A(n+1) (S12), and calculates filling color information (third filling color information) indicating the filling color of the intermediate data $B_{n,\ n+1}(k)$ by interpolation from filling color information (first and second filling color information) indicating the filling color of the stroke data A(n) and A(n+1) (S13). Incidentally, details of "interpolation" will be described later.

Here, the intermediate data generating circuit 11 performs S13 only in a case where each piece of the stroke data A(n) and A(n+1) constitutes a closed curve. In this case, each piece of the stroke data A(n) and A(n+1) includes information indicating a filling color described above (first and second filling color information), and the intermediate data generating circuit 11 calculates the filling color of each piece of intermediate data $B_{n,\ n+1}(k)$ on the basis of this information.

The processing at S15 to S17 is processing for each control point. The intermediate data generating circuit 11 performs the processing at S15 to S17 for each of the M control points $B_{n,\ n+1}(k)[m]$ of the intermediate data $B_{n,\ n+1}(k)$. Specifically, the intermediate data generating circuit 11 calculates the X-coordinate of the control point $PB_{n,\ n+1}(k)[m]$ by interpolation from the X-coordinates of control points PA(n)s[m] and PA(n+1)f[m] (S15), calculates the Y-coordinate of the control point $PB_{n,\ n+1}(k)[m]$ by interpolation from the Y-coordinates of the control points PA(n)s[m] and PA(n+1)f[m] (S16), and calculates line width information indicating the line width of the control point $PB_{n,\ n+1}(k)[m]$ by interpolation from the line width information indicating the line width of the control points PA(n)s[m] and PA(n+1)f[m] (S17).

Figure 8:
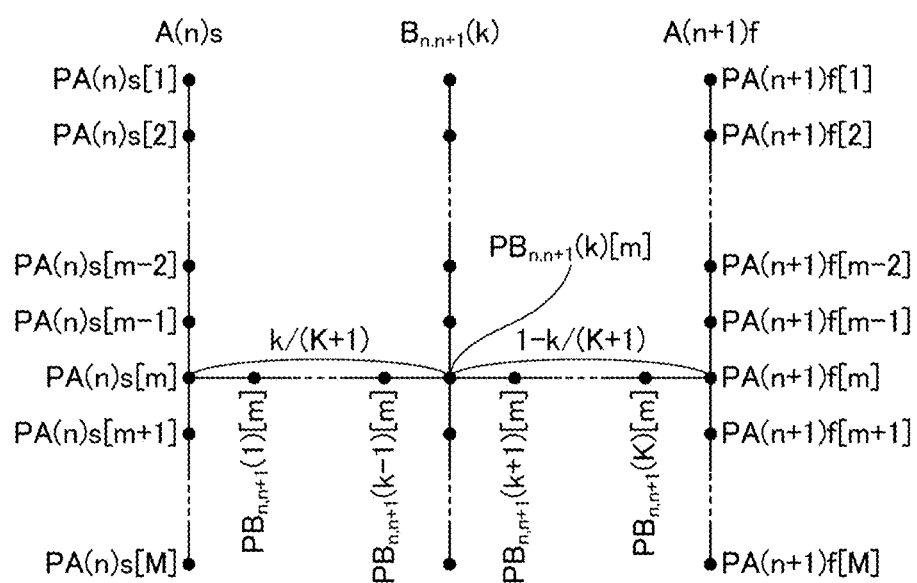
FIG. 8 is a diagram of assistance in explaining "interpolation" processing used at S12, S13, and S15 to S17 in FIG. 7.

FIG. 8 is a diagram of assistance in explaining the "interpolation" processing used at S12, S13, and S15 to S17. The diagram illustrates principles of the processing (S15 to S17) for each control point. As illustrated in the figure, the mth control point $PB_{n,\ n+1}(k)[m]$ of the kth intermediate data $B_{n,\ n+1}(k)$, for example, is calculated by interpolation from the mth control point PA(n)s[m] of the stroke data A(n)s and the mth control point PA(n+1)f[m] of the stroke data A(n+1)f by k/(K+1):1−k/(K+1). When written by equations, this is expressed as in the following Equations (1) to (3), where X1, Y1, and W1 are respectively the X-coordinate, Y-coordinate, and line width information of the control point PA(n)s[m], X2, Y2, and W2 are respectively the X-coordinate, Y-coordinate, and line width information of the control point PA(n+1)f[m], and X3, Y3, and W3 are respectively the X-coordinate, Y-coordinate, and line width information of the control point $PB_{n,\ n+1}(k)[m]$.

[Math. 1]

$$X3 = X2 \times \frac{k}{K+1} + X1 \times \left(1 - \frac{1}{K+1}\right) \quad (1)$$

-continued $$Y3 = Y2 \times \frac{k}{K+1} + Y1 \times \left(1 - \frac{1}{K+1}\right) \quad (2)$$

$$W3 = W2 \times \frac{k}{K+1} + W1 \times \left(1 - \frac{1}{K+1}\right) \quad (3)$$

The concept of the interpolation processing performed at S12 and S13 is the same as in Equations (1) to (3). In this case, however, the processing is performed for each piece of stroke data rather than for each control point. Specifically, line color information and filling color information are calculated by using the following Equations (4) and (5). In Equations (4) and (5), LC1 and FC1 are respectively the line color information and filling color information of the stroke data A(n)s, LC2 and FC2 are respectively the line color information and filling color information of the stroke data A(n+1)f, and LC3 and FC3 are respectively the line color information and filling color information of the intermediate data $B_{n, n+1}(k)$.

[Math. 2]

$$LC3 = LC2 \times \frac{k}{K+1} + LC1 \times \left(1 - \frac{1}{K+1}\right) \quad (4)$$

$$FC3 = FC2 \times \frac{k}{K+1} + FC1 \times \left(1 - \frac{1}{K+1}\right) \quad (5)$$

Returning to FIG. 3, the drawing processing circuit 12 is a functional circuit that sequentially draws a plurality of pieces of stroke data A(1) to A(N) included as key frames described above and each piece of intermediate data generated on the basis of the plurality of pieces of stroke data A(1) to A(N). Processing performed by the drawing processing circuit 12 will be described in detail in the following with reference to FIG. 9.

Figure 9:
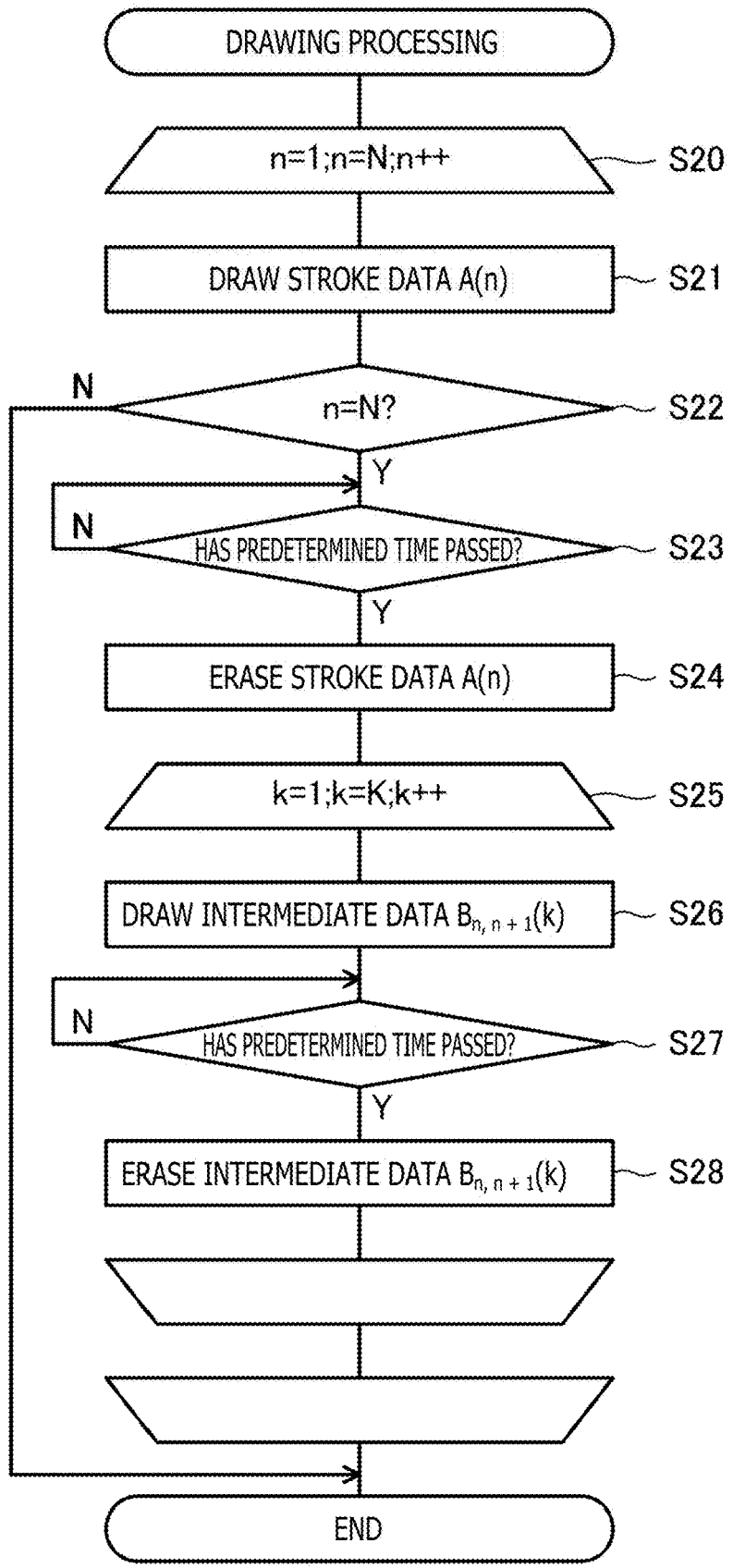
FIG. 9 is a flowchart illustrating a processing flow of drawing processing performed by a drawing processing circuit illustrated in FIG. 3.

FIG. 9 is a flowchart illustrating a processing flow of drawing processing performed by the drawing processing circuit 12. As illustrated in the figure, the drawing processing circuit 12 performs loop processing for each of the variables n and k. Specifically, the drawing processing circuit 12 is configured to repeatedly perform the processing at S21 to S28 for the variable n of 1 to N (S20), and repeatedly perform, for each n, the processing at S26 to S28 for the variable k of 1 to K (S11).

The processing at S21 to S24 is processing related to the drawing of the stroke data A(n) included as a key frame. Specifically, the drawing processing circuit 12 first draws the stroke data A(n) (S21). In this drawing, the drawing processing circuit 12 performs interpolation of a series of control points PA(n)[m] by a predetermined interpolation curve, as described above. In addition, the line color, line width, and filling color of a curve to be drawn are determined by reading line color information, line width information, and filling color information, respectively, from metadata added to the stroke data A(n).

After performing the drawing at S21, the drawing processing circuit 12 determines whether or not the variable n is equal to N. When the variable n is equal to N, the drawing processing circuit 12 ends the drawing processing. A state in which the stroke data A(N) is drawn remains on the screen after the end. When the variable n is not equal to N, on the other hand, the drawing processing circuit 12 waits for the passage of a predetermined time (S23), and then erases the drawn stroke data A(n) from the screen (S24).

The drawing processing circuit 12 after erasing the stroke data A(n) from the screen next sequentially draws the K pieces of intermediate data $B_{n, n+1}(k)$ generated on the basis of the stroke data A(n) and A(n+1) (S25). Specifically, the drawing processing is constituted of processing of drawing the intermediate data $B_{n, n+1}(k)$ (S26), processing of waiting for the passage of a predetermined time from the drawing (S27), and processing of erasing the drawn intermediate data $B_{n, n+1}(k)$ from the screen when the predetermined time has passed (S28).

Details of the processing of drawing the intermediate data $B_{n, n+1}(k)$ which processing is performed at S26 are basically similar to those of the processing of drawing the stroke data A(n) which processing is performed at S21. Specifically, the drawing processing circuit 12 performs interpolation of a series of control points $PB_{n, n+1}(k)[m]$ by a predetermined interpolation curve. In addition, the line color information determined for the intermediate data $B_{n, n+1}(k)$ at S12 in FIG. 7 is used as the line color information of a curve to be drawn. In addition, the line width information determined for each of the M control points $PB_{n, n+1}(k)[m]$ at S17 in FIG. 7 is used as the line width information of the curve to be drawn. Further, in the case where the filling color information is calculated at S13 in FIG. 7, a region corresponding to the inside of the closed curve constituted by the intermediate data $B_{n, n-1}(k)$ is filled on the basis of the calculated filling color information.

Figure 10:
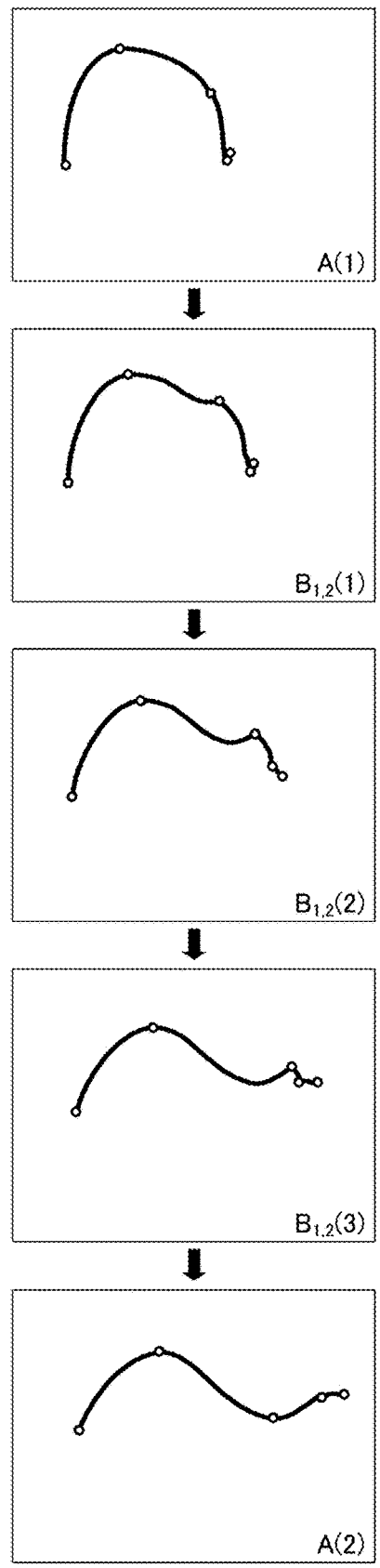
FIG. 10 is a diagram illustrating an example of stroke data drawn by the drawing processing illustrated in FIG. 9.

FIG. 10 is a diagram illustrating an example of the stroke data drawn by the drawing processing illustrated in FIG. 9. White circles indicated on curves in the diagram represent control points of the stroke data. The same is true for FIG. 11, FIG. 12, and FIG. 15 to be described later. Incidentally, the display of the control points can be turned on and off. The following description will be made supposing that the control points are displayed for the description of the drawing processing. However, the present disclosure is not limited to this. The control points may not be displayed. FIG. 10 illustrates stroke data A(1) and A(2) as key frames and three pieces of intermediate data $B_{1, 2}(1)$ to $B_{1, 2}(3)$ generated on the basis of the stroke data A(1) and A(2). In addition, no pen pressure information is added to the stroke data A(1) and A(2) illustrated in the figure. Hence, the line width of the curves is a default fixed value. Here, the stroke data A(1) and A(2) as key frames is drawn (rendered) and stored in the memory in advance. On the other hand, the intermediate data $B_{1, 2}(1)$ to $B_{1, 2}(3)$ is drawn (rendered) in real time each time the control points of the key frame are moved. A total number of frames therefore does not change (the same is true hereinafter).

As illustrated in FIG. 10, each piece of the intermediate data $B_{1, 2}(1)$ to $B_{1, 2}(3)$ has such a shape as to represent an interval during which the stroke data A(1) gradually changes and ultimately becomes the stroke data A(2). The drawing processing circuit 12 moves the respective control points of the stroke data A(1) toward the corresponding control points of the stroke data A(2), and performs rendering for each movement thereof. The user consequently views an animation moving image such that the stroke data A(1) changes gradually and ultimately becomes the stroke data A(2) via the intermediate data $B_{1, 2}(1)$ to $B_{1, 2}(3)$.

Figure 11:
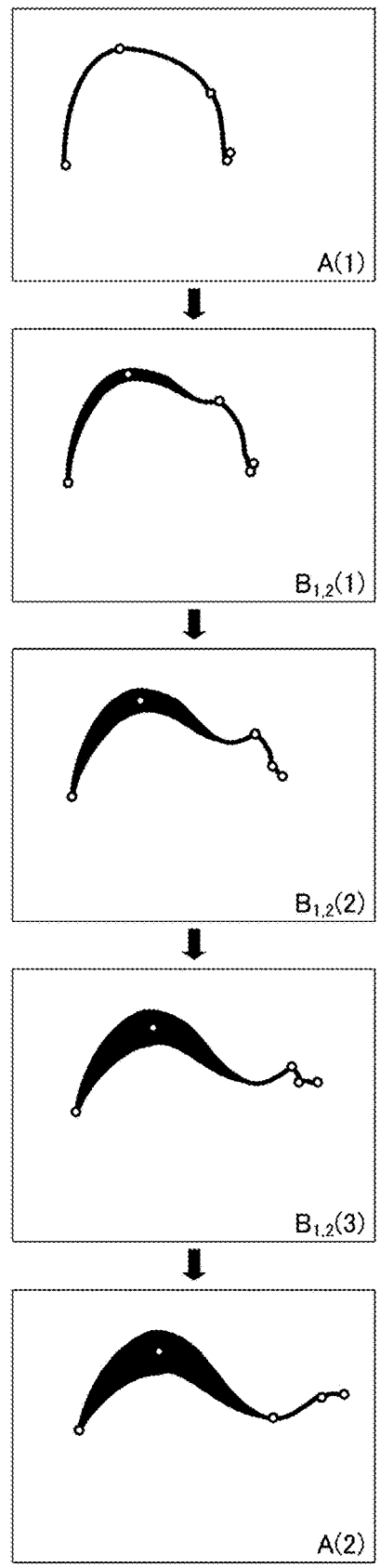
FIG. 11 is a diagram illustrating another example of the stroke data drawn by the drawing processing illustrated in FIG. 9.

FIG. 11 is a diagram illustrating another example of the stroke data drawn by the drawing processing illustrated in FIG. 9. A difference of the figure from FIG. 10 is in that pen pressure information is added to the stroke data A(2). As a result of determining line width information according to the pen pressure information, as illustrated in the figure, the line width of the stroke data A(2) is not a fixed value, and a thick part as compared with the line width (default fixed value) of the stroke data A(1) appears.

With regard to this thick part, the line width of each of the intermediate data $B_{1,2}(1)$ to $B_{1,2}(3)$ gradually changes from the line width of the stroke data A(1) and ultimately becomes the line width of the stroke data A(2), as illustrated in FIG. 11. Hence, the drawing processing circuit 12 draws the stroke data A(1), the intermediate data $B_{1,2}(1)$ to $B_{1,2}(3)$, and the stroke data A(2) in order indicated by arrows in FIG. 11. The user thereby views an animation moving image such that the line width of the stroke data A(1) gradually changes and ultimately becomes the line width of the stroke data A(2).

Figure 12:
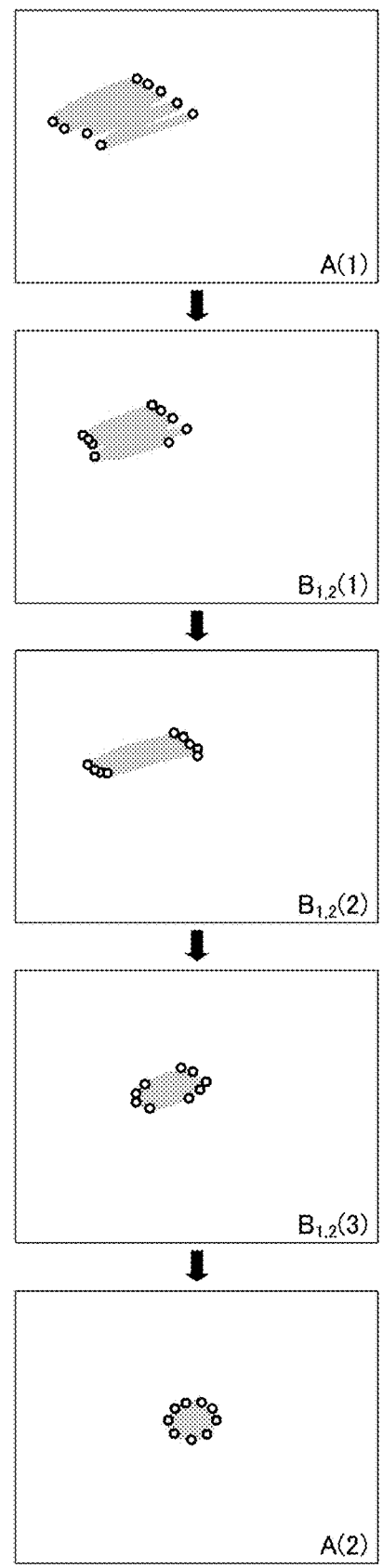
FIG. 12 is a diagram illustrating yet another example of the stroke data drawn by the drawing processing illustrated in FIG. 9.

FIG. 12 is a diagram illustrating yet another example of the stroke data drawn by the drawing processing illustrated in FIG. 9. A difference of the figure from FIG. 12 is in that both pieces of the stroke data A(1) and A(2) constitute a closed curve and are each assigned a filling color. Incidentally, each piece of the stroke data A(1) and A(2) has a same filling color. As illustrated in the figure, when the stroke data A(1) and A(2) represents a closed curve, each piece of the intermediate data $B_{1,2}(1)$ to $B_{1,2}(3)$ also represents a closed curve. In addition, a region inside each piece of the intermediate data $B_{1,2}(1)$ to $B_{1,2}(3)$ is filled as in the stroke data A(1) and A(2) on the basis of the filling color information calculated at S13 in FIG. 7.

As described above, the computer 1 according to the present embodiment generates intermediate data (the intermediate data $B_{n,n+1}(k)$ or the like) formed from movement of the stroke data by moving each control point of stroke data (obtaining the control points of the intermediate data by interpolation, for example). The generation of such intermediate data can be performed with a low processing load as compared with a case where intermediate frames are added by interpolation processing. The computer 1 according to the present embodiment can therefore generate an animation moving image more effectively. Specifically, a problem of an increase in amount of usage of the memory and a problem of being unable to view the animation moving image until an end of intermediate frame generation processing are solved.

In addition, the computer 1 according to the present embodiment generates temporary stroke data (the stroke data A(n)s and A(n+1)f or the like) having the same number of control points, and generates intermediate data on the basis of the temporary stroke data. It is thus possible to generate an animation moving image without depending on the number of control points of the stroke data (the stroke data A(n) and the like) as key frames.

Figure 13:
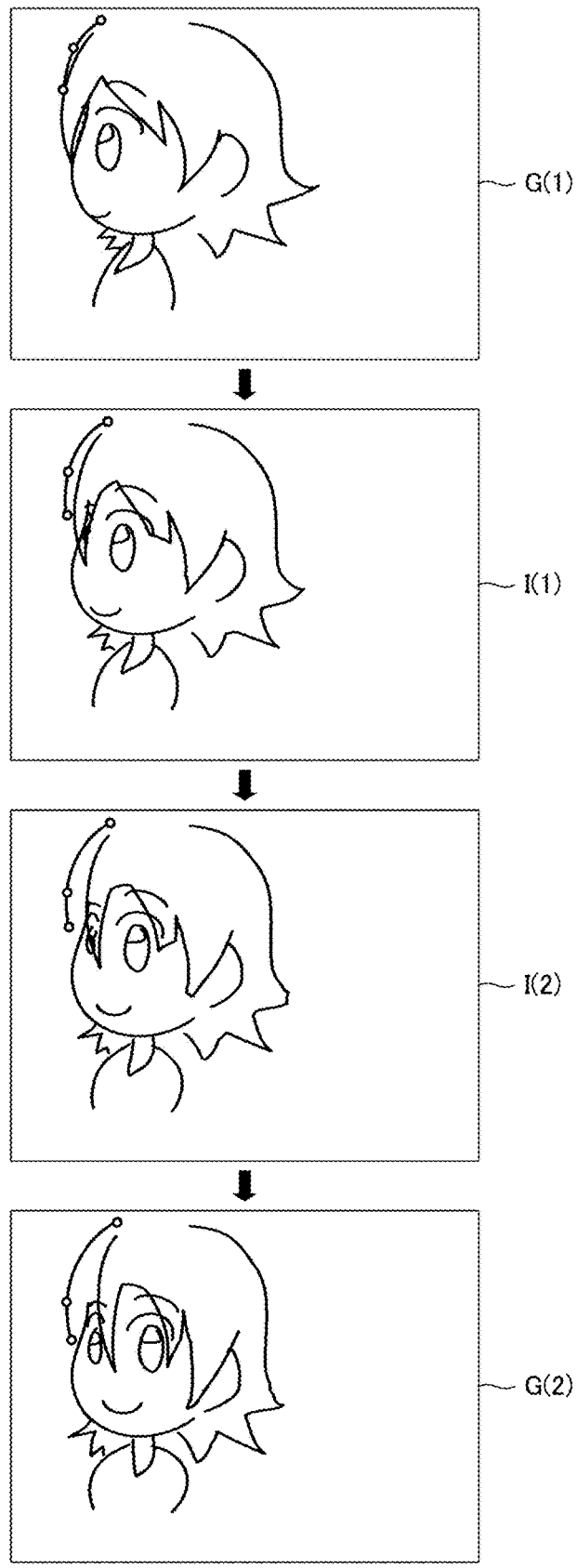
FIG. 13 is a diagram illustrating an example of application of a drawing method according to the first embodiment of the present disclosure.

FIG. 13 is a diagram illustrating an example of application of a drawing method according to the present embodiment. In the present application example, two key frames G(1) and G(2) each including a plurality of pieces of stroke data are prepared in advance, and the computer 1 automatically generates an animation moving image that represents transitions from the key frame G(1) to the key frame G(2). Concrete description will be made in the following.

When the computer 1 receives input of the key frames G(1) and G(2), the computer 1 associates each of a plurality of pieces of stroke data included in the key frame G(1) with one of a plurality of pieces of stroke data within the key frame G(2). This association may be performed by automatic processing of the computer 1, or may be manually performed by the user. For example, strokes may be associated in order in which the strokes are drawn, or an rth drawn stroke of G(1) and an sth (s is a positive integer different from r) drawn stroke of G(2) may be configured to be selectable from the input device. The computer 1 preferably receives a specification of an association by the user in a case where the key frame G(1) and the key frame G(2) have different numbers of pieces of stroke data, in a case where association is desired to be made in order different from the order in which strokes are drawn, or the like. In relation to this, there is, for example, a case where a line constituted by one piece of stroke data in one key frame is divided into two or more pieces of stroke data in another key frame. In such a case, stroke data generated first in time series is preferably set as a target of association in principle. In FIG. 13, for the convenience of description, illustratively, each stroke is displayed by associating a stroke first drawn in the key frame G(1) with a stroke first drawn in the key frame G(2), moving control points as in intermediate data I(1) and I(2), and performing rendering for each movement thereof.

The computer 1 performs the processing by the control point changing circuit 10, the intermediate data generating circuit 11, and the drawing processing circuit 12 illustrated in FIG. 3 for each set of associated stroke data. As a result of the processing by the intermediate data generating circuit 11 among these circuits, a plurality of pieces of intermediate data are each generated. FIG. 13 illustrates two pieces of intermediate data I(1) and I(2) as an example of the thus generated intermediate data. The drawing processing circuit 12 draws the stroke data (including the intermediate data) included in each of the key frame G(1), the intermediate data I(1) and I(2), and the key frame G(2) in order of the key frame G(1), the intermediate data I(1) and I(2), and the key frame G(2). The computer 1 thus generates an animation moving image based on the two key frames each including a plurality of pieces of stroke data.

In the example of FIG. 13, an animation moving image is automatically generated which naturally represents a process in which a person turns around, from the key frame G(1) in which the person facing sideways is depicted by the plurality of pieces of stroke data to the key frame G(2) representing a state in which the person has turned around to the front. Thus, the computer 1 according to the present embodiment can automatically generate intermediate data between the two key frames, and provide a natural animation moving image. Incidentally, while the image G(2) represents the right eye of the person, the image G(1) depicts a stroke of the right eye in a state of being superimposed on a stroke of a cheek. It is thereby possible to generate an animation moving image such that the right eye not seen in the original image G(1) gradually appears and becomes visible.

Figure 14:
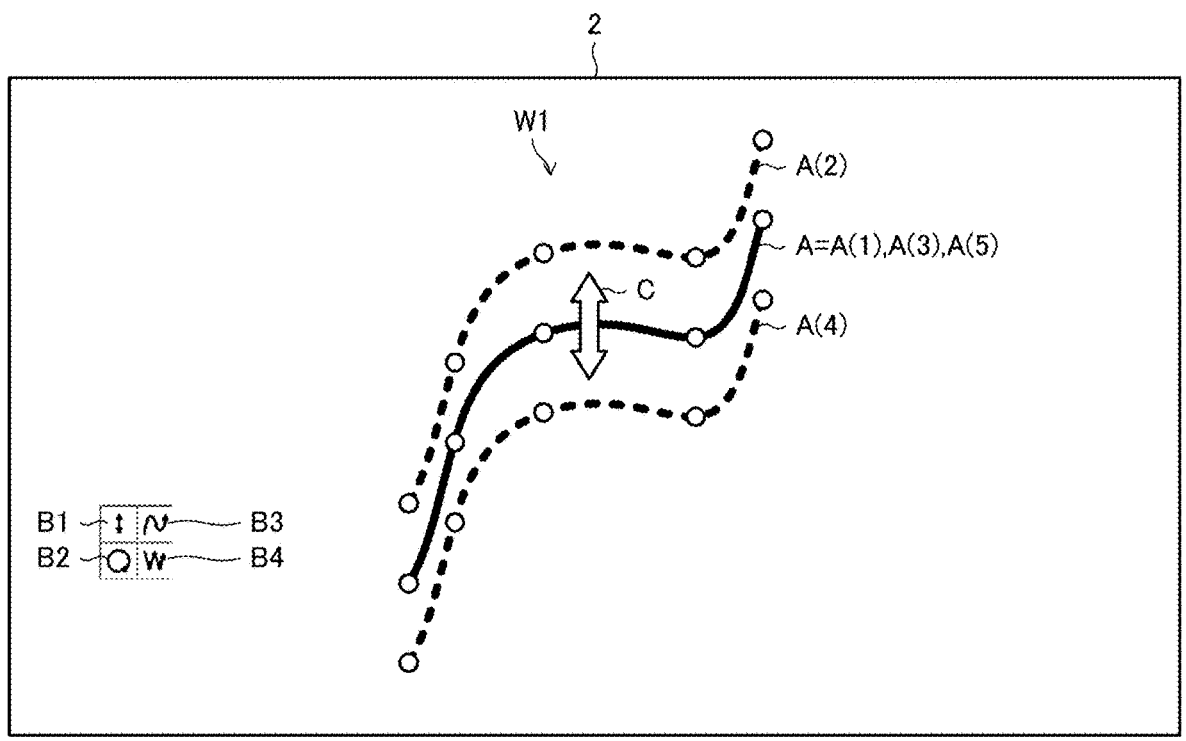
FIG. 14 is a diagram illustrating an example of a screen displayed on a display by a computer according to a second embodiment of the present disclosure.

FIG. 14 is a diagram illustrating an example of a screen displayed on a display device 2 by a computer 1 according to a second embodiment of the present disclosure. The computer 1 according to the present embodiment is different from the computer 1 according to the first embodiment in that the computer 1 according to the present embodiment is capable of generating an animation moving image even from one piece of stroke data. The computer 1 according to the present embodiment is otherwise similar to the computer 1 according to the first embodiment. Thus, in the following, same configurations as in the first embodiment are identified by the same reference numerals and description thereof will be omitted, and description will be made directing attention to differences from the first embodiment. Incidentally, while description will be made by using one piece of stroke data in the present embodiment, the present disclosure is not limited to this, but an animation moving image can be similarly generated for a plurality of pieces of stroke data.

FIG. 14 illustrates the screen of the drawing app also illustrated in FIG. 2. As illustrated in the figure, the screen of the drawing app according to the present embodiment displays movement type specifying buttons B1 to B4 for specifying details of movement of stroke data. Pictures indicating details of movement are drawn on the respective surfaces of the movement type specifying buttons B1 to B4. Incidentally, while four movement type specifying buttons B1 to B4 are illustrated here, it suffices for the number of movement type specifying buttons to be one or more. In addition, the details of movement assigned to each of the movement type specifying buttons are not limited to those illustrated in the figure.

Illustrated within the window W1 of FIG. 14 are stroke data A as an example and movement of the stroke data A in a case where the user depresses the movement type specifying button B1 in a state in which the stroke data A is displayed. As illustrated in the figure, in response to the depression of the movement type specifying button B1 by the user, the computer 1 moves control points of the stroke data A vertically along the direction of an arrow C indicated in the figure (vertical direction within the screen), and performs rendering for each movement thereof. The computer 1 thereby generates and draws an animation moving image of the stroke data. An operation of the computer 1 for realizing this will be described in detail in the following with reference to FIG. 15.

Figure 15:
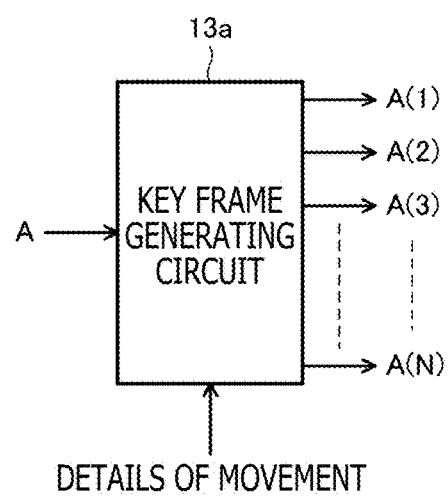
FIG. 15 is a schematic block diagram illustrating functional blocks of the computer according to the second embodiment of the present disclosure.

FIG. 15 is a schematic block diagram illustrating functional blocks of the computer 1 according to the present embodiment. As illustrated in the figure, the computer 1 according to the present embodiment is functionally configured to have a key frame generating circuit 13a. Incidentally, the computer 1 according to the present embodiment also has the control point changing circuit 10, the intermediate data generating circuit 11, and the drawing processing circuit 12 (see FIG. 3) described in the first embodiment, though the circuits are not illustrated in the figure.

The key frame generating circuit 13a is a functional circuit that obtains the stroke data A drawn within the window that is active at a time point that a movement type specifying button is depressed, and generates a plurality of pieces of stroke data A(1) to A(N) (change information) indicating movement destinations of the respective control points of the stroke data A on the basis of the stroke data A and details of movement specified by the movement type specifying button. The generated pieces of stroke data A(1) to A(N) are each supplied as a key frame described above to the control point changing circuit 10 illustrated in FIG. 3. As a result, the drawing processing circuit 12 illustrated in FIG. 3 draws an animation moving image.

FIG. 14 illustrates an example of the stroke data A(1) to A(N) generated by the key frame generating circuit 13a. In the present example, N=5. The stroke data A(1) is the stroke data A itself. The stroke data A(2) is data formed by translation of the stroke data A in an upward direction by a predetermined distance. The stroke data A(3) is the stroke data A itself. The stroke data A(4) is data formed by translation of the stroke data A in a downward direction by a predetermined distance. The stroke data A(5) is the stroke data A.

When the key frame generating circuit 13a thus generates the stroke data A(1) to A(5), the animation moving image drawn by the drawing processing circuit 12 is such that the stroke data A is first translated in the upward direction, next returns to the original position, is further translated in the downward direction, and returns to the original position. That is, an animation moving image of content such that the stroke data A moves up and down is drawn by the movement of the control points of the stroke data and rendering for each movement thereof.

Predetermined control point moving methods, such as a rotary movement when the button B2 is pressed, a curvilinear movement when the button B3 is pressed, and a zigzag movement when the button B4 is pressed, or the like can be similarly specified by the buttons. Kinds of movements are not limited to these examples, but include various movements. In addition, while the display of the buttons conceptually indicates the movements in the present embodiment, there is no limitation to this, but display of images, icons, or the like may be used.

As described above, according to the computer 1 in accordance with the present embodiment, the key frame generating circuit 13a generates a plurality of pieces of stroke data (key frames) to be supplied to the control point changing circuit 10 illustrated in FIG. 3 on the basis of one piece of stroke data specified by the user. It is therefore possible to generate an animation moving image of content such that one piece of stroke data makes a movement according to a specification of the user by using a function of the computer 1 described in the first embodiment (that is, a function of generating intermediate data formed from movement of the stroke data by moving each control point of the stroke data and performing rendering for each movement).

Incidentally, not only the movements and rotation as illustrated in FIG. 14 but also changes in line color, line width, and filling color and changes in shape may be able to be specified as details of movement specified by movement type specifying buttons. In a case where changes in line width are specified as details of movement, for example, the plurality of pieces of stroke data A(1) to A(N) generated by the key frame generating circuit 13a function as line width information indicating the changes in line width.

Figure 16:
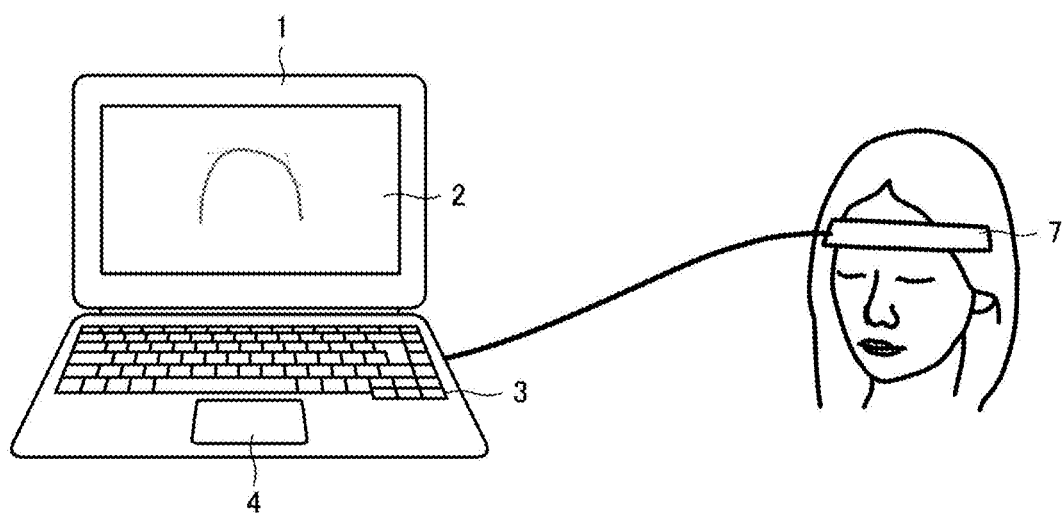
FIG. 16 is a diagram illustrating a computer and a brain wave measuring device according to a third embodiment of the present disclosure.

FIG. 16 is a diagram illustrating a computer 1 and a brain wave measuring device 7 according to a third embodiment of the present disclosure. The computer 1 according to the present embodiment is different from the computer 1 according to the second embodiment in that the computer 1 according to the present embodiment generates an animation moving image by moving control points of stroke data on the basis of brain wave information obtained by the brain wave measuring device 7 rather than the movement type specifying buttons, and performing rendering processing for each movement thereof. The computer 1 according to the present embodiment is otherwise similar to the computer 1 according to the second embodiment. Thus, in the following, same configurations as in the second embodiment are identified by the same reference numerals and description thereof will be omitted, and description will be made directing attention to differences from the second embodiment.

The brain wave measuring device 7 is, for example, used in a state of being placed on the head of a user. The brain wave measuring device 7 is configured to be able to measure the brain wave of the user. The computer 1 according to the present embodiment is supplied with brain wave information indicating the brain wave measured by the brain wave measuring device 7.

Figure 17:
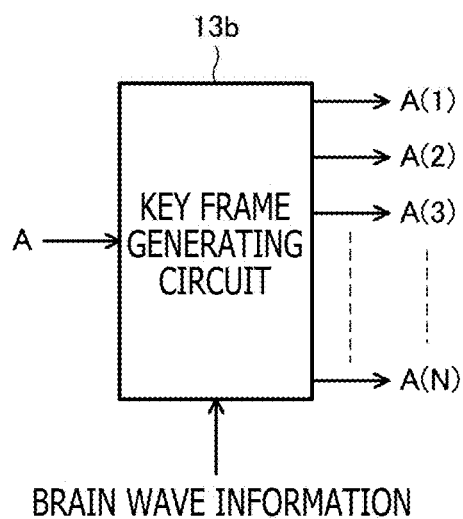
FIG. 17 is a schematic block diagram illustrating functional blocks of the computer according to the third embodiment of the present disclosure.

FIG. 17 is a schematic block diagram illustrating functional blocks of the computer 1 according to the present embodiment. As illustrated in the figure, the computer 1 according to the present embodiment is functionally configured to have a key frame generating circuit 13b. Incidentally, the computer 1 according to the present embodiment also has the control point changing circuit 10, the intermediate data generating circuit 11, and the drawing processing circuit 12 (see FIG. 3) described in the first embodiment, though the circuits are not illustrated in the figure.

The key frame generating circuit 13b is a functional circuit that determines details of movement of stroke data on the basis of the brain wave information supplied from the brain wave measuring device 7, and generates a plurality of pieces of stroke data A(1) to A(N) (change information) representing details of changes in each control point of stroke data A drawn within a window, the stroke data A being specified in advance by the user, on the basis of the stroke data A and the determined details of movement. The generated pieces of stroke data A(1) to A(N) are each supplied as a key frame described above to the control point changing circuit 10 illustrated in FIG. 3. As a result, the drawing processing circuit 12 illustrated in FIG. 3 draws an animation moving image.

In determining the details of movement of the stroke data on the basis of the brain wave information, the key frame generating circuit 13b first obtains emotion information indicating an emotion of the user from the brain wave information. The key frame generating circuit 13b then determines the details of movement of the stroke data according to the emotion of the user which emotion is indicated by the emotion information. For example, a movement such as hopping is conceivable in a case where the user is joyful, or a movement such that the positions of both ends are lowered is conceivable in a case where the user is depressed. As more concrete processing, it suffices for the key frame generating circuit 13b to store the emotion information and the details of movement of the stroke data in association with each other in advance, and determine the details of movement of the stroke data from the emotion information on the basis of the stored content.

Incidentally, the key frame generating circuit 13b may determine, as a part or the whole of details of movement, not only a change in position of the stroke data (that is, a change in at least one of an X-coordinate and a Y-coordinate) but also a change in additional information such as line color, line width, filling color, or the like of the stroke data. For example, when the user is joyful, a change in line color and filling color may be determined such that the change is made to one of warm colors, or when the user is depressed, a change in line color and filling color may be determined such that the change is made to one of cold colors.

The key frame generating circuit 13b thus determines the details of movement of the stroke data A, and generates the stroke data A(1) to A(5) on the basis of the determined details. It is thereby possible to express the emotion of the user at a given time point by the movement of the stroke data A.

As described above, according to the computer 1 in accordance with the present embodiment, the key frame generating circuit 13b determines the details of movement of stroke data on the basis of brain wave information, and generates a plurality of pieces of stroke data (key frames) to be supplied to the control point changing circuit 10 illustrated in FIG. 3 on the basis of the determined details. It is therefore possible to express the emotion of the user by the movement of the stroke data by using a function of the computer 1 described in the first embodiment (that is, a function of generating intermediate data formed by changing the stroke data by moving each control point of the stroke data and performing rendering for each movement).

Incidentally, the brain wave measuring device 7 is used in the present embodiment. However, for example, brain wave data and digital ink data when characters or the like are written by an electronic pen may be stored in association with each other in advance, and the emotion information may be obtained by obtaining the brain wave data from the digital ink data of the electronic pen. In addition, the emotion information may be obtained not only from the brain wave but also from other biological information. For example, various kinds of devices capable of detecting the emotion information from biological information such as a pulse, a heartbeat, blood pressure, the number of steps, space sensing, or the like can be used in place of the brain wave measuring device 7 or together with the brain wave measuring device 7.

Figure 18:
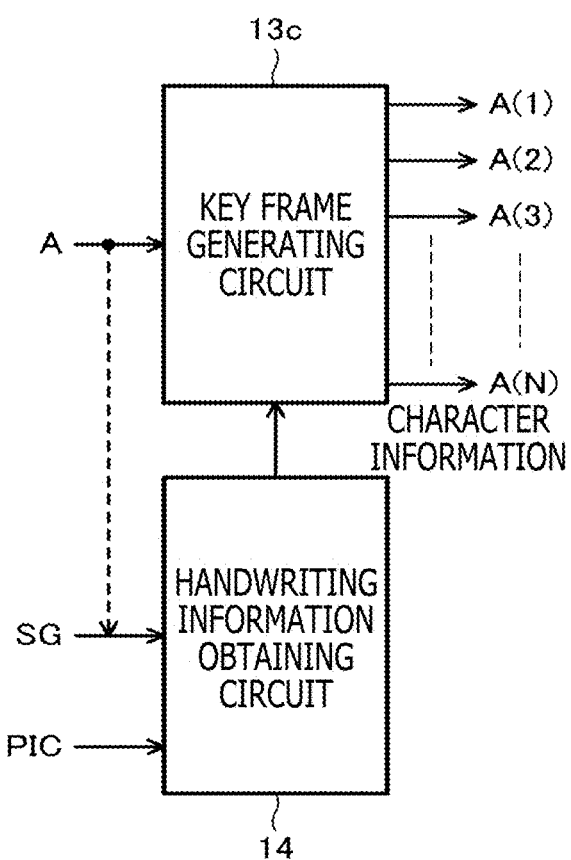
FIG. 18 is a schematic block diagram illustrating functional blocks of a computer according to a fourth embodiment of the present disclosure.

FIG. 18 is a schematic block diagram illustrating functional blocks of a computer 1 according to a fourth embodiment of the present disclosure. The computer 1 according to the present embodiment is different from the computer 1 according to the third embodiment in that the computer 1 according to the present embodiment obtains personality information indicating the personality of a user from handwriting of the user, moves control points of stroke data on the basis of the obtained personality information, and generates an animation moving image by rendering processing for each movement thereof. The computer 1 according to the present embodiment is otherwise similar to the computer 1 according to the third embodiment. Thus, in the following, same configurations as in the third embodiment are identified by the same reference numerals and description thereof will be omitted, and description will be made directing attention to differences from the third embodiment.

As illustrated in FIG. 18, the computer 1 according to the present embodiment is functionally configured to have a handwriting information obtaining circuit 14 and a key frame generating circuit 13c. Incidentally, the computer 1 according to the present embodiment also has the control point changing circuit 10, the intermediate data generating circuit 11, and the drawing processing circuit 12 (see FIG. 3) described in the first embodiment, though the circuits are not illustrated in the figure.

The handwriting information obtaining circuit 14 is a functional circuit that obtains handwriting information representing one or more characters written by the user. Specifically, the handwriting information obtaining circuit 14 may obtain the handwriting information by obtaining a stroke data group SG formed of one or more pieces of stroke data input by the user using the electronic pen 6 (see FIG. 1), for example, and subjecting the stroke data group SG to predetermined recognition processing, or may obtain the handwriting information by obtaining image data PIC, which is obtained by scanning characters written on paper or the like by a scanner (not illustrated), and subjecting the image data PIC to predetermined recognition processing. Incidentally, as indicated by a broken line arrow in FIG. 18, stroke data A set as an object of movement by a specification of the user (stroke data A supplied to the key frame generating circuit 13c) may be used as the whole or a part of the one or more pieces of stroke data constituting the stroke data group SG.

The handwriting information obtained from the stroke data group SG includes, in each character, a combination of one or more pieces of stroke data constituting the character. Here, each piece of stroke data includes a series of control points and metadata, as described above. Each piece of metadata is stored in association with a control point. The metadata can include pen pressure information, line width information, color information, filling color information, and the like described above, and also include shading information, time stamp information indicating a date and time, tilt information indicating an angle of the electronic pen 6 with respect to the input surface, rotation information indicating an angle of rotation of the electronic pen 6 about a normal to the input surface, speed information indicating a writing speed, and the like. Of these pieces of metadata, metadata included in the stroke data constituting the stroke data group SG is inherited also to the handwriting information.

The key frame generating circuit 13c is a functional circuit that determines details of movement of stroke data on the basis of the handwriting information obtained by the handwriting information obtaining circuit 14, and generates a plurality of pieces of stroke data A(1) to A(N) (change information) indicating movement destinations of respective control point of the stroke data A drawn within a window, the stroke data A being specified by the user in advance, on the basis of the stroke data A and the determined details of movement. The generated pieces of stroke data A(1) to A(N) are each supplied as a key frame described above to the control point changing circuit 10 illustrated in FIG. 3. As a result, the drawing processing circuit 12 illustrated in FIG. 3 draws an animation moving image.

The key frame generating circuit 13c is configured to first obtain personality information indicating the personality of the user from the handwriting information in determining the details of movement of the stroke data on the basis of the handwriting information. In the following, this will be described concretely with reference to FIGS. 19A, 19B, and 19C.

Figure 19A:
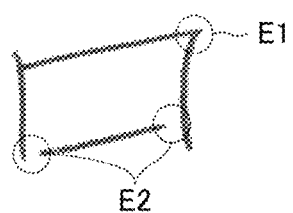
FIGS. 19A, 19B, and 19C are diagrams illustrating a concrete example of individual characters represented by handwriting information obtained by a handwriting information obtaining circuit illustrated in FIG. 18.
Figure 19B:
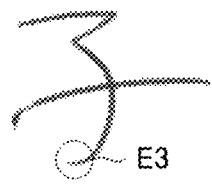
Figure 19C:
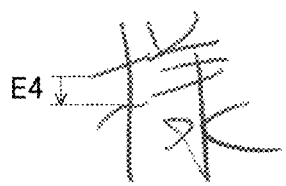

FIGS. 19A, 19B, and 19C are diagrams illustrating a concrete example of individual characters represented by handwriting information obtained by the handwriting information obtaining circuit 14. Characters indicated in FIGS. 19A, 19B, and 19C are respectively "口," "亨," and "様" as Chinese characters, and characteristics E1 to E4 indicated in the figures represent handwriting characteristics from which the personality of the user can be read. Specifically, the characteristic E1 is referred to as a "sharp, angular downward turn type," and indicates a user personality of being "meticulous" or "going by the rules." The characteristic E2 is referred to as a "downward open type," and indicates a user personality of being "flexible," "considerate," or "concessive." The characteristic E3 is referred to as a "weak upstroke type," and indicates a user personality of being "nimble and agile but having a tendency to be irresponsible." The characteristic E4 is referred to as a "displaced stroke start type," and indicates a user personality of being "driven by feelings and particular about hobbies and preferences."

Thus, according to the handwriting information, the personalities of users can be read variously. The foregoing Non-Patent Document 1 discloses a large number of concrete examples in relation to this point. The key frame generating circuit 13c is configured to obtain personality information indicating the personality of the user by analyzing the handwriting information using the characteristics of such handwriting information.

Here, in the case where the handwriting information is obtained from the stroke data group SG, the key frame generating circuit 13c can obtain the personality information on the basis of the metadata associated with the individual control points. To cite an example, handwriting characteristics of a "stroke start twist type" and a "gentle stroke start type" described in Non-Patent Document 1 include an aspect of shape as to the presence or absence of a twist at a stroke start part in addition to the strength of pen pressure, as described on page 5 of Non-Patent Document 1. In Non-Patent Document 1, the strength of pen pressure is read from the thickness of a line written on paper. However, the computer 1 according to the present embodiment can obtain pen pressure as directly measured data by using the pen pressure information within the metadata, and can therefore determine the characteristics of handwriting more finely.

The key frame generating circuit 13c after obtaining the personality information determines the details of movement of the stroke data according to the personality of the user which personality is indicated by the personality information. As more concrete processing, as with the key frame generating circuit 13b described in the third embodiment, it suffices for the key frame generating circuit 13c to store the personality information and the details of movement of the stroke data in association with each other in advance, and determine the details of movement of the stroke data from the personality information on the basis of the stored content.

Incidentally, as described in the third embodiment, the key frame generating circuit 13c may determine, as a part or the whole of details of movement of control points, not only a change in position of the stroke data (that is, a change in at least one of an X-coordinate and a Y-coordinate) but also a change in the metadata such as line color, line width, filling color, or the like associated with the control points constituting the stroke data.

The key frame generating circuit 13c thus determines the details of movement of the stroke data A, and generates the stroke data A(1) to A(5) on the basis of the determined details. It is thereby possible to express the personality of the user at a given time point by the movement of the stroke data A.

As described above, according to the computer 1 in accordance with the present embodiment, the key frame generating circuit 13c determines the details of movement of stroke data on the basis of the handwriting information obtained by the handwriting information obtaining circuit 14, and generates a plurality of pieces of stroke data (key frames) to be supplied to the control point changing circuit 10 illustrated in FIG. 3 on the basis of the determined details. It is therefore possible to express the personality of the user by the movement of the stroke data by using a function of the computer 1 described in the first embodiment (that is, a function of generating intermediate data formed by changing the stroke data by moving each control point of the stroke data and performing rendering for each movement thereof).

Preferred embodiments of the present disclosure have been described above. However, the present disclosure is not at all limited to such embodiments but, needless to say, the present disclosure can be carried out in various modes without departing from the spirit of the present disclosure.

For example, in each of the foregoing embodiments, the intermediate data is generated by interpolating each of the X-coordinate, Y-coordinate, and line width of each control point and line color and filling color of each piece of stroke data. However, parameters other than these parameters may be set as an object of interpolation. For example, in a case where stroke data as a key frame is drawn within a three-dimensional space (that is, 3D data), the Z-coordinate of each control point is preferably set as an object of interpolation. In that case, the coordinates (X-coordinate, Y-coordinate, and Z-coordinate) of control points constituting the stroke data are each moved.

In addition, while Equations (1) to (5) described above suppose interpolation along a straight line, intermediate data may be generated by interpolation along a predetermined curve.

In addition, in the third embodiment, the key frame generating circuit 13*b* determines the details of movement of stroke data according to the emotion of the user, and in the fourth embodiment, the key frame generating circuit 13*c* determines the details of movement of stroke data according to the personality of the user. However, the emotion of the user and the personality of the user may be combined with each other, and the details of movement of stroke data may be determined according to the characteristic of the user which characteristic includes at least one of the emotion and personality of the user. This makes it possible to realize the movement of the stroke data which movement is closer to the intention of the user.

What is claimed is:

1. A drawing device that draws stroke data of each of a plurality of strokes including a first stroke and a second stroke, the stroke data of each of the strokes including a plurality of control points, the drawing device comprising:
    at least one processor; and
    at least one memory device storing at least one program that, when executed by the at least one processor, causes the drawing device to:
        adjust a number of the control points included in the stroke data of the first stroke or a number of the control points included in the stroke data of the second stroke until the number of the control points included in the stroke data of the first stroke is equal to the number of the control points included in the stroke data of the second stroke;
        after the number of the control points included in the stroke data of the first stroke or the number of the control points included in the stroke data of the second stroke is adjusted, generate intermediate data using the control points included in the stroke data of the first stroke and the control points included in the stroke data of the second stroke; and
        control a display device to sequentially draw at least the generated intermediate data.

2. The drawing device according to claim 1,
    wherein each of the plurality of control points includes coordinates on the display device, and
    wherein the at least one program, when executed by the at least one processor, causes the drawing device to generate the intermediate data by changing each of the plurality of control points according to given change information.

3. The drawing device according to claim 2, wherein the at least one program, when executed by the at least one processor, causes the drawing device to:
    determine details of the movement of the stroke data according to a characteristic of a user, the characteristic including at least one of an emotion and a personality of the user,
    generate the change information based on the determined details of the movement and the stroke data, and
    generate the intermediate data by changing each of the plurality of control points according to the change information.

4. The drawing device according to claim 3,
    wherein the at least one program, when executed by the at least one processor, causes the drawing device to obtain emotion information indicating the emotion of the user based on measured biological information of the user, and determine the details of the movement of the stroke data according to the emotion of the user, the emotion being indicated by the obtained emotion information.

5. The drawing device according to claim 3, wherein the at least one program, when executed by the at least one processor, causes the drawing device to:
    obtain handwriting information representing one or more characters written by the user,
    obtain personality information indicating the personality of the user based on the handwriting information, and determine the details of the movement of the stroke data according to the personality of the user, the personality being indicated by the obtained personality information.

6. The drawing device according to claim 5, wherein the at least one program, when executed by the at least one processor, causes the drawing device to:
    obtain the handwriting information by subjecting a stroke data group including one or more pieces of stroke data to predetermined recognition processing,
    wherein the handwriting information includes metadata included in each of the one or more pieces of stroke data, and
    obtain the personality information based on the metadata included in the handwriting information.

7. The drawing device according to claim 1,
    wherein the plurality of control points each include line width information indicating a line width, and
    wherein the at least one program, when executed by the at least one processor, causes the drawing device to generate the intermediate data by changing the line width information of each of the plurality of control points according to predetermined line width information.

8. The drawing device according to claim 1,
    wherein the at least one program, when executed by the at least one processor, causes the drawing device to:
    adjust the number of the control points included in the stroke data of the first stroke and the number of the control points included in the stroke data of the second stroke by:
        calculating a least common multiple of the number of the control points included in the stroke data of the first stroke and the number of the control points included in the stroke data of the second stroke,
        adding a first number of the control points to the stroke data of the first stroke, wherein the first number of the control points is the least common multiple minus the number of the control points included in the stroke data of the first stroke; and
        adding a second number of the control points to the stroke data of the second stroke, wherein the second number of the control points is the least common multiple minus the number of the control points included in the stroke data of the second stroke.

9. The drawing device according to claim 1,
    wherein the at least one program, when executed by the at least one processor, causes the drawing device to:
    adjust the number of the control points included in the stroke data of the first stroke or the number of the control points included in the stroke data of the second stroke by:
        removing at least one of the control points of the stroke data of the first stroke, or
        removing at least one of the control points of the stroke data of the second stroke.

10. The drawing device according to claim 1,
wherein the at least one program, when executed by the at least one processor, causes the drawing device to:
calculate an x-coordinate of each of the control points included in the intermediate data by interpolation using an interpolation curve, an x-coordinate of one of the control points included in the stroke data of the first stroke, and an x-coordinate of one of the control points included in the stroke data of the second stroke, and
calculate a y-coordinate of each of the control points included in the intermediate data by interpolation using the interpolation curve, a y-coordinate of the one of the control points included in the stroke data of the first stroke, and a y-coordinate of the one of the control points included in the stroke data of the second stroke.

11. A drawing method for drawing stroke data of each of a plurality of strokes including a first stroke and a second stroke, the stroke data of each of the strokes including a plurality of control points, the drawing method comprising:
adjusting a number of the control points included in the stroke data of the first stroke or a number of the control points included in the stroke data of the second stroke until the number of the control points included in the stroke data of the first stroke is equal to the number of the control points included in the stroke data of the second stroke;
after the adjusting, generating intermediate data using the control points included in the stroke data of the first stroke and the control points included in the stroke data of the second stroke; and
sequentially drawing the stroke data and the intermediate data.

12. The drawing method according to claim 11,
wherein the adjusting includes:
calculating a least common multiple of the number of the control points included in the stroke data of the first stroke and the number of the control points included in the stroke data of the second stroke,
adding a first number of the control points to the stroke data of the first stroke, wherein the first number of the control points is the least common multiple minus the number of the control points included in the stroke data of the first stroke; and
adding a second number of the control points to the stroke data of the second stroke, wherein the second number of the control points is the least common multiple minus the number of the control points included in the stroke data of the second stroke.

13. The drawing method according to claim 11,
wherein the adjusting includes:
removing at least one of the control points of the stroke data of the first stroke, or
removing at least one of the control points of the stroke data of the second stroke.

14. The drawing method according to claim 11,
wherein the generating includes:
calculating an x-coordinate of each of the control points included in the intermediate data by interpolation using an interpolation curve, an x-coordinate of one of the control points included in the stroke data of the first stroke, and an x-coordinate of one of the control points included in the stroke data of the second stroke, and
calculating a y-coordinate of each of the control points included in the intermediate data by interpolation using the interpolation curve, a y-coordinate of the one of the control points included in the stroke data of the first stroke, and a y-coordinate of the one of the control points included in the stroke data of the second stroke.

* * * * *